(12) United States Patent
Lubin et al.

(10) Patent No.: US 12,076,976 B2
(45) Date of Patent: Sep. 3, 2024

(54) OPTIMIZED PRINTING DEFECT COMPENSATION USING AUTOMATIC JOB IMAGE REPOSITIONING

(71) Applicant: Xerox Corporation, Norwalk, CT (US)

(72) Inventors: Dara N. Lubin, Pittsford, NY (US); Elizabeth L Barrese, Penfield, NY (US); Ron E. Dufort, Rochester, NY (US); Matthew J. Ochs, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 470 days.

(21) Appl. No.: 17/412,671

(22) Filed: Aug. 26, 2021

(65) Prior Publication Data

US 2023/0068167 A1    Mar. 2, 2023

(51) Int. Cl.
*G06K 15/02* (2006.01)
*B41F 33/00* (2006.01)
*G01N 21/88* (2006.01)

(52) U.S. Cl.
CPC ..... *B41F 33/0036* (2013.01); *G01N 21/8851* (2013.01); *G01N 2021/8874* (2013.01); *G01N 2021/8887* (2013.01)

(58) Field of Classification Search
CPC ......... G06T 7/0004; G06T 2207/20081; G06T 2207/30108; G06T 7/001; G06T 11/00; G06T 2207/20084; G06T 2207/20212; G06T 2207/20221; G06T 7/0008; G06T 7/11; G06T 2207/10024; G06T 2207/20076; G06T 2207/20092; G06T 2207/30144; G06T 2207/30168; G06T 2207/30176; G06T 2207/30252; G06T 2207/30261; G06T 7/0002; G06T 7/12; G06T 7/50; G06T 7/97; G06F 2111/04; G06F 2111/10; G06F 2111/20; G06F 2119/18; G06F 30/3323; G06F 18/2178; G06F 18/2415; G06F 18/285; G06F 18/40; G06V 20/52; G06V 10/464; G06V 10/7784; G06V 10/945; G06V 10/98; G06V 20/56; G06V 20/60; G06V 2201/06;
(Continued)

(56) References Cited

U.S. PATENT DOCUMENTS 5,241,348 A   8/1993   Garavuso et al.
7,125,094 B2  10/2006  Mizes
(Continued)

OTHER PUBLICATIONS

Mathematics Stack Exchange, Fitting Rectangle Inside Another Rectangle in Diagonal, https://math.stackexchange.com/questions/847282/fitting-rectangle-inside-another-rectangle-in-diagonal, Accessed on Aug. 26, 2021, pp. 1-5.

*Primary Examiner* — Quan M Hua
(74) *Attorney, Agent, or Firm* — Gibb IP Law Firm, LLC

(57) ABSTRACT

A processor identifies print defect locations where printing defects occur and a assigns different sensitivity values to different zones of a job image being prepared for printing by a printing engine. The processor changes the orientation of the job image to a revised orientation, relative to print media, to avoid locating one or more high-sensitivity zones of the job image in the print defect locations. The high-sensitivity zones are ones of the zones having a sensitivity value above a threshold sensitivity value. The printing engine prints the job image on the print media at the revised orientation.

20 Claims, 10 Drawing Sheets

(58) Field of Classification Search
CPC ......... G06V 30/224; G01N 2021/8861; G01N 2021/888; G01N 21/892; G01N 21/8983
See application file for complete search history.

(56) References Cited

U.S. PATENT DOCUMENTS

| | | |
|---|---|---|
| 7,887,154 B2 | 2/2011 | Vladislav |
| 7,990,568 B2 | 8/2011 | Lee |
| 8,248,652 B2 | 8/2012 | Wardell et al. |
| 8,279,482 B2 | 10/2012 | Tomizuka et al. |
| 8,497,999 B2 | 7/2013 | Kujirai et al. |
| 8,570,601 B2 | 10/2013 | Skinner et al. |
| 8,672,436 B2 | 3/2014 | Powers et al. |
| 2007/0195351 A1* | 8/2007 | Mashtare ............... G06K 15/00 358/1.13 |
| 2008/0137914 A1 | 6/2008 | Minhas |
| 2014/0085645 A1* | 3/2014 | Okazaki ............... G06F 3/1285 358/1.2 |
| 2017/0140524 A1* | 5/2017 | Karsenti ............... G06T 7/0004 |
| 2017/0341453 A1* | 11/2017 | Hunkeler ................ B41J 11/70 |
| 2018/0300434 A1* | 10/2018 | Hu .................... G03F 7/70508 |

* cited by examiner

OPTIMIZED PRINTING DEFECT COMPENSATION USING AUTOMATIC JOB IMAGE REPOSITIONING

BACKGROUND

Systems and methods herein generally relate to printers and printing systems and more particularly to systems and methods that compensate for defects with the printer or printing system.

Modern high performance printing systems are very complex devices that require regular service to perform at their highest level. However, between regularly scheduled service visits, issues can arise with the printing elements that results in decreases in job image quality (IQ) of the printed product. For example, in all types of printers, components that move sheets of print media may become worn to the point that they scratch the printed sheets, resulting in lines through job images. In other examples of specific devices, with inkjet printers for example, the jets of the printhead can become clogged, resulting in portions of job images not being printed, which can cause streaking, inconsistent color application, etc.

If deadlines are not present, the uses may simply wait until an engineer is able to service the printer to repair the printer defect. However, it is more commonplace for users to be unable to wait for a service call. Therefore, users often take matters into their own hands and perform the corrective action that they can. In some situations, defective parts may be user replaceable. In other situations, a user may adjust or clean printing components in an effort to cure the job image quality issue. For example, with an inkjet press, the user may perform purging and wiping operations of the printheads. However, such user-performed solutions sometime fail. Such failures, and simply placing the burden of curing the problem on the user, can result in user dissatisfaction.

SUMMARY

Various methods herein identify print defect locations of a printer (e.g., failed jets, scratches, etc.). For example, the printer can maintain a history of the printer's known defects that have accumulated since the last service, and these methods can access that history data. Alternatively, in order to identify print defect locations these methods can automatically print a test sheet on print media using a printer and then can automatically scan the printed test sheet to identify print defect locations on the print media. Also, these methods can assign a defect rating to each of the print defect locations based on the likelihood printing defects will occur at the print defect locations (e.g., based on the type or severity of the printing defect, the location of the printing defect, etc.).

With respect to a job image that is being prepared for printing on the print media by the printer, these methods create at least one high-sensitivity zone and at least one low-sensitivity zone segregating relatively high-sensitivity image elements (having sensitivity values above the threshold sensitivity value) from relatively low-sensitivity image elements (having sensitivity values no greater than the threshold sensitivity value).

The methods herein assign different sensitivity values to the different zones of the job image. The different sensitivity values can be assigned, for example, by reviewing shapes, colors, textures, etc., in the job image to identify and/or classify specific image elements within the job image. These methods then reference a known chart, table, database, etc., of sensitivity values for the image elements to allocate a sensitivity value to each of the image elements in the job image.

With these methods, in order to avoid locating one or more high-sensitivity zones of the job image in any of the print defect locations, the orientation of the job image, relative to the print media, can be automatically changed to a revised orientation. The high-sensitivity zones are the zones that have a sensitivity value above a threshold sensitivity value. In addition to changing the orientation, these methods can change the location of the job image, relative to the print media, to a revised location and/or can remove printing on the print media in order to avoid locating one or more high-sensitivity zones of the job image in the print defect locations.

After changing the orientation and/or location of the job image, these methods can calculate the probability that the revised location of the job image on the print media results in a defect-free printing of the job image. This defect probability is based on the defect rating of the print defect locations calculated previously, and on the location of the high-sensitivity zones relative to the print defect locations.

A representation of how the job image would appear positioned on the print media in the revised orientation and/or location can be displayed on the printer's user interface. Further, the defect probability can be output on the printer's user interface and the user interface can receive, in response, feedback from the user that may further alter the job image orientation and/or location. This allows the methods herein to further revise the orientation/location of the job image to an additionally revised orientation/location based on the feedback.

Additionally, these methods can create a coversheet that has cutting alignment lines corresponding to the revised orientation of the job image. These methods can then print the job image on the print media at the revised orientation (or the additionally revised orientation/location) and also print the coversheet.

Printing device embodiments herein include (among other components) a processor and a printing engine, scanner, user interface, etc., all operatively connected to the processor. If needed to identify print defect locations, the printing engine can be adapted to print a test image element on print media using a printer and the scanner can be adapted to scan the printed image element and produce a scan. The processor can be adapted to analyze the scan and automatically identify the print defect locations on the print media where printing defects occur. The processor is further adapted to assign a defect rating to each of the print defect locations based on the likelihood of the printing defects occurring at the print defect locations.

The processor can also be adapted to assign different sensitivity values to different zones of the job image being prepared for printing on the print media by the printing engine. The processor is adapted to assign these different sensitivity values by identifying image elements (and/or categories of image elements) within the job image and referencing a known chart, table, database, etc., of sensitivity values for the image elements to allocate a sensitivity value to each of the image elements. The processor is adapted to create at least one high-sensitivity zone and at least one low-sensitivity zone segregating relatively high-sensitivity image elements (having sensitivity values above the threshold sensitivity value) from relatively low-sensitivity image elements (having sensitivity values no greater than the threshold sensitivity value).

To avoid locating one or more of the high-sensitivity zones in the print defect locations, the processor is adapted to change the orientation of the job image to a revised orientation, relative to the print media. The processor can also be adapted to change the location of the job image to a revised location, relative to the print media, and even remove printing on the print media external to the job image, when changing the location of the job image, to avoid locating the high-sensitivity zones in the print defect locations.

After changing the orientation and/or location of the job image, the processor is adapted to calculate the probability that the revised location will result in a defect-free printing of the job image based on the defect rating of the print defect locations and based on the location of the high-sensitivity zones relative to the print defect locations. The user interface is adapted to display a representation of how the job image would appear positioned on the print media in the revised orientation and/or location and the defect probability before the printing engine prints the job image. The user interface is also adapted to receive feedback from the in response to outputting the job image representation and defect probability. In turn, the processor is adapted to revise the orientation of the job image to an additionally revised orientation based on such feedback.

The processor can also be adapted to create a coversheet having cutting alignment lines corresponding to the revised orientation of the job image. The printing engine is adapted to print the job image on the print media at the revised orientation and print the coversheet.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
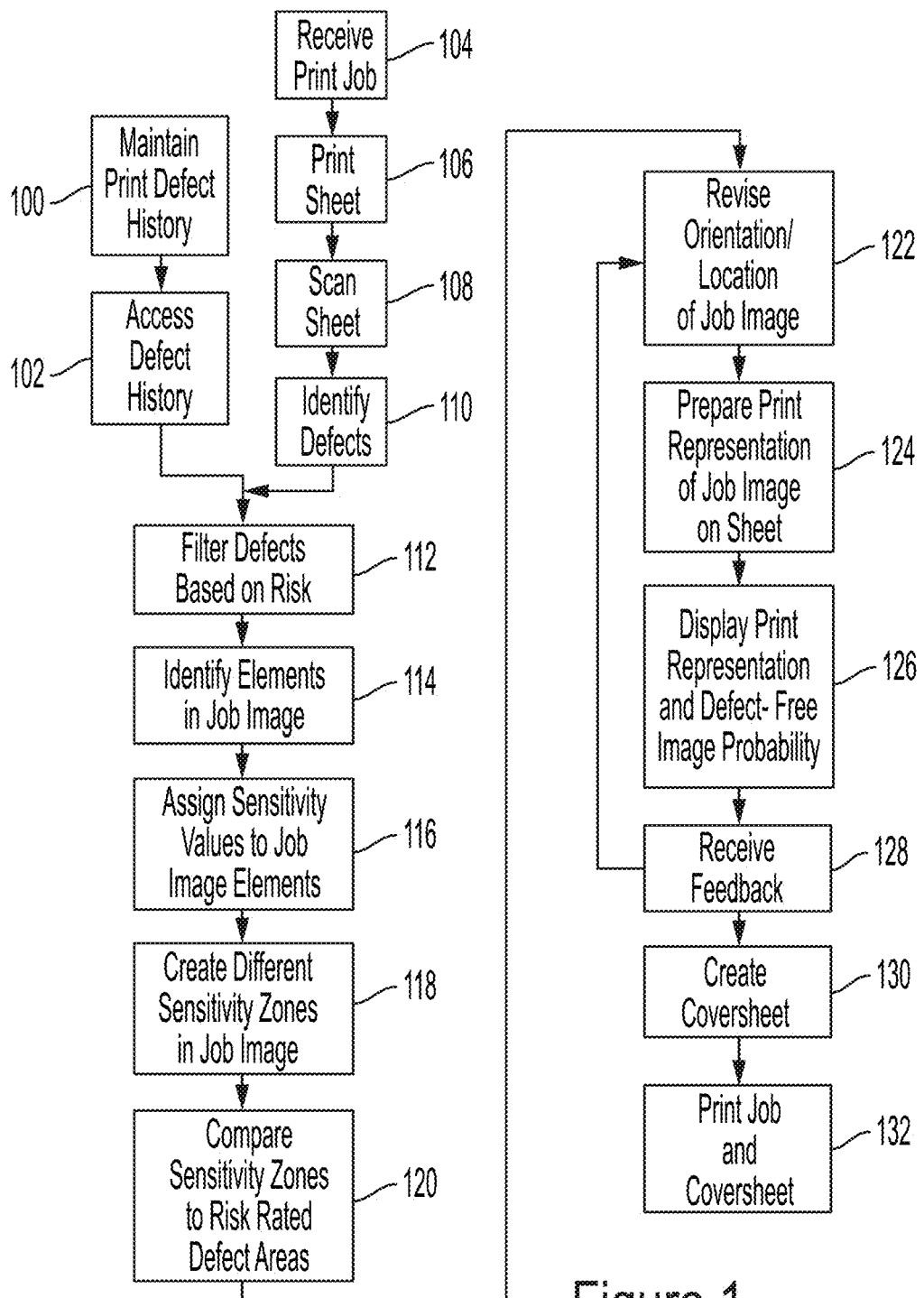
FIG. 1 is a flow diagram of various methods herein.

As mentioned above, between regularly scheduled service visits, issues can arise with printing components that result in decreases in job image quality (IQ). If users are unable to fix the printer themselves, they may resort to changing the print job in order that the printer defect does not result in defective output. In one example, if a user is performing N-up printing (where multiple job images are printed on each sheet) the N-up job images that suffer job image quality defects may simply be discarded or the print job can be changed so that job images are not printed in areas of the sheet where job image quality defects regularly occur. While this will allow printing to continue, it can waste printing resources and cause user dissatisfaction, and may not be an optimal solution (may be more wasteful for one or more resources compared to alternatives).

Thus, in some situations, the user may manually move a job image around a page in such a way as to avoid placing a job image in the path of a missing jet or scrapping component. However, such a work-around can be based on trial and error, which can be time consuming and frustrating and may not result in an acceptable result. To make such manual adjustments, users may need to know the location of missing jets (which can be manually mapped on test sheets); however, the operator still must decide the direction to shift the job image and, again, this typically involves iterations of prints which is wasteful. Some imposition programs allow rotation of a smaller square or rectangle on a larger sheet; however, such rotation is limited to 90° increments, restricting the options of the user.

In view of these and other issues, the systems and methods herein fully automate the process of producing an optimized layout of the print job which eliminates or minimizes print defects. The systems and methods herein use the knowledge of the missing jet location, and automatically move a job image on the page and place the print job on the page such that the offending missing jet is not used, or its failure is undetectable in the printed item.

With the systems and methods herein, information not available to users is already automatically available in the digital front end (DFE) using sensors in the job image path and various print inspection systems. In some examples, the print inspect system compares a source job image to a printed scanned job image using an included job image inspection module. With such print inspection systems, a scanner internal to the printer can scan a printed sheet. The print inspection systems highlight the discrepancies between the source job image and the printed job image as printing defects.

Information about the defect locations relative to the page from the scanned job image is automatically communicated back to the digital front end and used to optimize the page layout to minimize any print defects. The systems and methods herein perform a number of automated actions including: analyzing a printed test image; assigning risk levels to defect locations on the test print; analyzing an image file of a job to be printed; assigning sensitivity ratings to zones of the job image; comparing risk-ratings of the defect locations to sensitivity-ratings for each area of the job image to generate a pristine-print probability; and presenting a user with options for the best imposition that will minimize conflicts and maximize probability of a pristine print; etc.

FIG. 1 is flowchart illustrating some aspects of exemplary methods herein. These methods automatically identify print defect locations of a printer (e.g., failed jets, scratches, etc.). Thus, as a first overall step, these processes monitor job image quality by scanning known test patterns, or the actual print job, using the full width array. Further, these methods store a history of error-prone areas (e.g., using a log of missing jets, streaks, etc.).

For example, in item 100 the printer can maintain a history of the printer's known defects that have accumulated since the last service, and these methods can access that history data, as shown in item 102. At any point in this process (which is arbitrarily shown in item 104 in FIG. 1) the printing device/system receives a print job that contains at least one job image to be printed.

Figure 2:
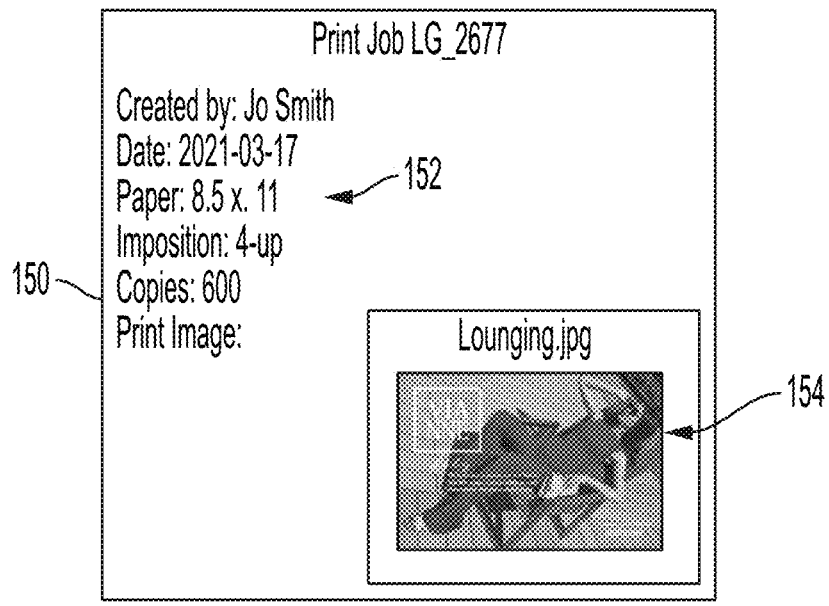
FIG. 2 is a conceptual representation of a print job.

FIG. 2 conceptually illustrates one example of a print job 150 (e.g., "Print Job LG_2677") that could be received by a printing system. This exemplary print job 150 contains various items of data and settings 152, some of which can be the creator's name, creation date, selected paper size, selected imposition, number of copies, identification of item to be printed (Lounging.jpg, etc.). For illustration purposes, an image 154 (e.g., Lounging.jpg, etc.) is shown in FIG. 2 as the item that is to be printed, and such will be printed using 4-up imposition to produce 600 copies, per the setting 152 in the print job 150.

Rather than maintaining a defect history of the printer, in order to identify print defect locations these methods also can automatically print a (test) sheet on print media using a printer (item 106) and then can automatically scan the printed test sheet (item 108) to identify print defect locations on the print media (item 110). This test sheet can be printed before a job is started or during the printing of the job (e.g., mid-job) to maintain image quality throughout the job.

Figure 3:
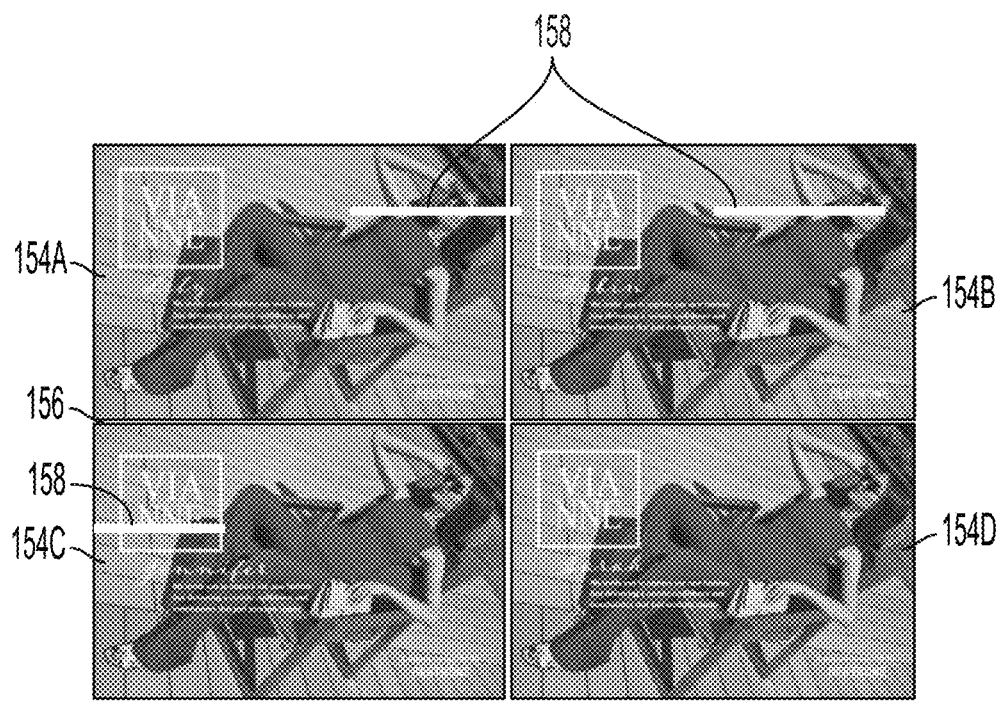
FIG. 3 is a scan image of a test print with printing defects.

FIG. 3 conceptually illustrates an example of an image produced by a scan of a test print 156. The test print 156 positions images 154 in the 4-up imposition according to the settings 152 of the print job 150 (where the individual 4-up images are identified in FIG. 3 using numbers 154A-154D).

As shown in FIG. 3, the scan of the test print 156 shows some scratches 158 that occurred during printing because of defects within the printer, potentially because of worn sheet moving elements internal to the printer, or other defective printing components. These types of defects 158 may not be easily resolved by the user, which might require the user to wait for a service call. However, as explained below, the systems and methods herein address these types of situations through optimized printer defect compensation that uses automatic job image repositioning.

As one part of this processing, as shown in item 112, the methods herein automatically filter printing defects that have a risk rating at or below a minimum risk threshold to remove very low risk printing defects from the analysis. Thus, these methods can assign a defect rating to each of the print defect locations (158 in FIG. 3) based on the likelihood printing defects will occur at the print defect locations (e.g., based on the type or severity of the printing defect, the location of the printing defect, etc.). Methods herein section the full width printing area and assign danger or image quality "risk-ratings" to each print area (e.g., pixels or areas) using a metric which estimates the chances that a certain type of defect will occur there. For purposes herein, the illustrated print defect locations 158 have a risk rating that exceeds the minimum risk threshold and are therefore considered to cause possible image quality defects in all printed items.

Referring again to FIG. 1, with respect to this job image 154 that is being prepared for printing on print media by the printer, in item 114 these methods identify image elements (e.g., image elements within the job image 154) for example, by reviewing shapes, colors, textures, etc., in the job image to identify and/or classify specific image elements within the job image. In item 114, image elements such as sky, skin, faces, hands, floor/ground textures, furniture, plants, etc., can be identified using known identification processes.

The methods herein automatically assign sensitivity types and/or values to these image elements in item 116. In one example, these methods can reference a known chart, table, database, etc., of sensitivity values for the image elements to allocate a sensitivity value to each of the image elements in the job image. Such charts can generally assign a higher sensitivity value to "faces" than "bricks," for example, although any classification can be used to assign sensitivity values, depending upon the user's goals.

Additionally, methods herein can assign a sensitivity type to various image elements in item 116. Certain image elements are more sensitive to certain types of defects. For example, an area with a smooth halftone gradient would be more sensitive to defects of banding or mottle than it would to defects of a missing jet; and, conversely, an area with fine text might be more sensitive to a missing jet than to banding. Both areas are more sensitive to defects than a non-printed zone, but each is sensitive to different amounts depending on the type of defect. Thus, in item 116, these methods additionally (or alternatively) assign sensitivity types to image elements that cause some printer defects (e.g., missing jets) to be evaluated for the given sensitivity type, while other printer defects (e.g., banding) are not evaluated for that sensitivity type. With this, overlap of coordinates of printing defects with image elements will only be objectionable if the sensitivity type corresponds to the specific printing defect.

In item 118, these methods automatically segregate the job image into different zones 164, 166 to create at least one high-sensitivity zone (166) and at least one low-sensitivity zone (164). Thus, as a second overall step, methods herein analyze the job image by zones and sensitivity ratings. These methods assign sensitivity ratings to each image element based on the chances that certain types of defects will impact the job image quality.

Thus, the image elements are analyzed and tagged by types, for example, sky, face, half-tone, darkness, area coverage, etc. The job image area is then sectioned into a grid, with zones. Zones are shaped to principally include either high-sensitivity image elements or low-sensitivity image elements and the zones on the job image are tagged as less sensitive or more sensitive to job image problems based on which image elements they contain. For example, a patterned background composed of faint woodgrain would be less sensitive, whereas a solid dark long hairstyle would be more sensitive.

Figure 4:
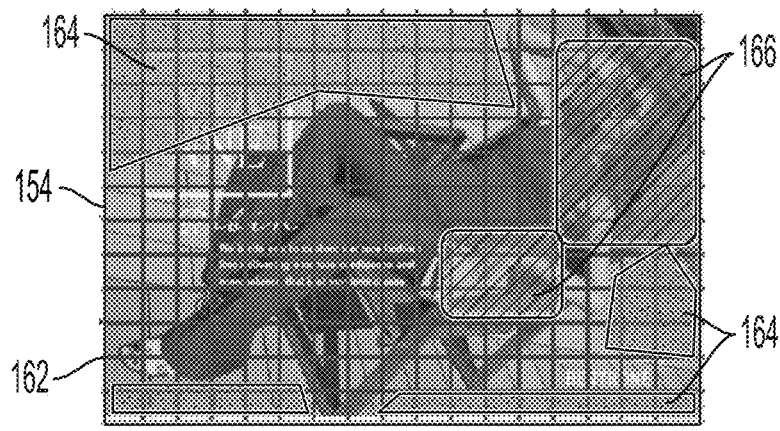
FIG. 4 is an illustration showing sensitivity zones of an image.

FIG. 4 illustrates this conceptually by illustrating a grid 162 overlaid on the job image 154. The grid 162 acts as a coordinate reference for the processes herein. Similarly, the pixels that make up the image could form the coordinate reference. In FIG. 4, different zones in the image are identified as more or less sensitive to defects. For example, anything near hands or face must have no defects. Any gray texture background is less sensitive and may hide a defect.

Therefore, items such as the tiles or bricks in the job of image 154 are classified as being relatively less sensitive to other items within the job image 154 and the portions of the job image 154 that include the tiles or bricks are included within a sensitivity zone 164 that is relatively less sensitive. To the contrary, the methods herein identify face and hand features as being relatively more sensitive. Therefore, these items are included within a more sensitive zone 166, as shown in FIG. 4.

Print zone mapping allows the methods herein to compare the coordinate locations of the more sensitive zones of the job image to the coordinates of the location of the defects (that have risk ratings above the minimum threshold). The sensitivity values are adjustable so that the number of defect locations (e.g., where a missing jet would be obvious) is kept to a minimum. Thus, a parameter is identified as acceptable to place the defects 158, most likely missing jets, in the areas mapped on the job image as less sensitive 164. Therefore, as shown in item 120 in FIG. 1, the methods herein automatically compare the sensitivity zones in the job image to the sufficiently risk-rated defect areas.

Figure 5:
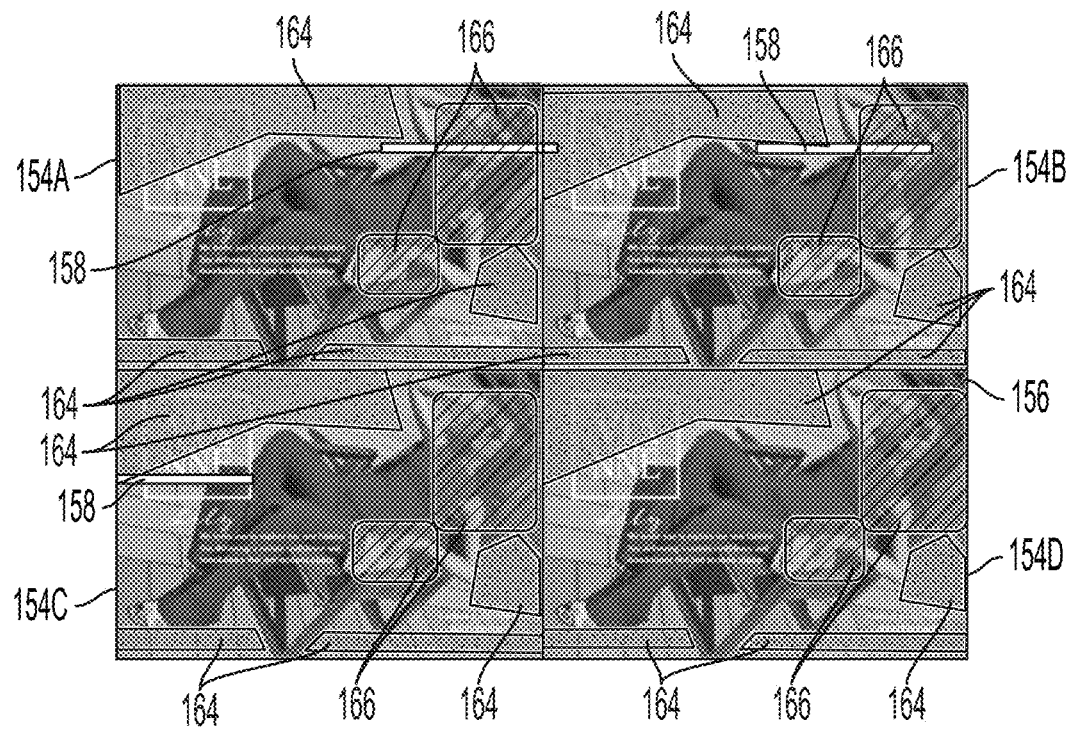
FIG. 5 is an illustration overlaying sensitivity zones on an image with printing defects.

One way to do this is conceptually shown in FIG. 5 where the defect locations 158 are overlaid on the more and less sensitive zones 164, 166 within the 4-up job images (154A-154D). More specifically, the coordinates of the defect locations 158 are compared to the coordinates of the zones 164, 166 to ensure that none of the defect locations 158 have the same coordinates as the more sensitive zones 166.

As can be seen in job image 154C in FIG. 5, the defect location 158 does not overlap or intersect a high-sensitivity zone 166. However, the defect locations 158 in job images 154A and 154B shares coordinates of the high-sensitivity zones 166. Because of this coordinate overlap, the methods herein automatically rotate and or reposition the job images 154A-154D until the defect location 158 does not share coordinates of a high-sensitivity zone 166, as discussed below.

More specifically, in order to avoid locating one or more high-sensitivity zones 166 of the job image 154 in any of the print defect locations 158, the orientation of the job image, relative to the print media, can be automatically changed to a revised orientation in item 122. In addition to changing the orientation, in item 122 these methods can change the location of the job image, relative to the print media, to a revised location and/or can remove printing on the print media (e.g., change 4-up printing to 2-up printing) in order to avoid locating one or more high-sensitivity zones of the job image in the print defect locations.

When determining how much to rotate the job image 154 or where to relocate the job image 154 in item 122, these methods automatically calculate the probability that the revised location of the job image on the print media results in a defect-free printing of the job image. Therefore, as a third overall step, these methods compare the defect rating of each print defect location 158 (from item 110) and the sensitivity-ratings for each zone 164, 166 in the job image 154 (from item 118) and generate a pristine-print probability as a numerical score.

In item 122, these methods can also automatically evaluate options for job image rotation/relocation by modelling/predicting a "pristine-print probability score" for different rotations/relocations (different impositions). Therefore, these methods can determine the pristine-print probability score for a variety of positions, rotations, number of instances/"N-ups", etc. The rotation/relocation of the job image that minimizes conflicts of high-sensitivity zones and high defect rating locations and maximizes the probability of a pristine-print is selected as the rotation/relocation for the job image in item 122.

In other words, the systems and methods herein automatically evaluate a number of criteria when performing the process that determines the optimum rotation and relocation of the n-up job images. As noted above, some of the criteria include whether the more sensitive zones 166 share coordinates with the print defects 158 that exceed the minimum defect threshold. Other criteria scored by the optimization can include the number of images per sheet (where a higher number is better), the amount of unused printable area (where a lower amount is better), the number of cut lines per sheet (where a lower number is better), the number of the more sensitive zones 166 that share coordinates with the print defects that do not exceed the minimum defect threshold (where a lower number is better), the number of images on a sheet that can share the same rotation/movement (where a higher number is better), etc. The processing herein applies unique weighting to these (and possibly other) criteria differently in the optimization to eventually produce a pristine-print score for each possible rotation/relocation n-up image imposition to find the highest scoring imposition as the optimized layout.

Such processing consistently produces better results when compared to manual adjustments because manual adjustments only look to avoid overlap between defects and sensitive image areas. Manual adjustments do not simultaneously consider multiple differently weighted criteria and manual adjustments do not consider all or most possible rotation/relocation possibilities, while the optimization processes herein do. Therefore, the processing herein not only automatically identifies the locations of sufficiently risky printing defects, but these systems and methods also automatically perform the evaluation and selection of the optimum solution before the user is even aware a problem may exist. This saves the user substantial time and frustration and produces a better result than the user would achieve manually. Further, these systems and methods reduce waste and conserve resources by avoiding the iterative printing and evaluation processes that manual corrections require.

Figure 6:
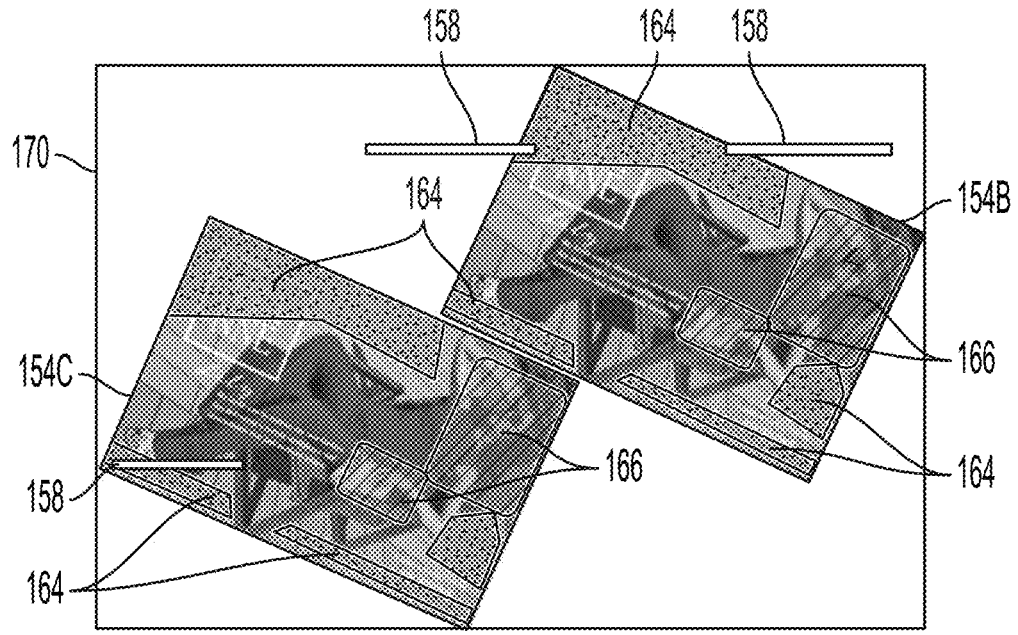
FIG. 6 is an illustration of an optimized imposition of a print job that avoids intersection of sensitive image zones and printing defects.

FIG. 6 illustrates an example of this optimized layout (imposition) 170. More specifically, the optimized layout in FIG. 6 shows two of the previous 4 job images (e.g., items 154B and 154C) rotated and repositioned so that none of the defect locations intersect or overlap the high-sensitivity zones 166.

As a fourth overall step, the methods herein provide this optimized layout (alternative impositions/job image shift) to the user for feedback. Thus, a representation of how the job image would appear positioned on the print media in the revised orientation and/or location is automatically created in item 124.

Figure 7:
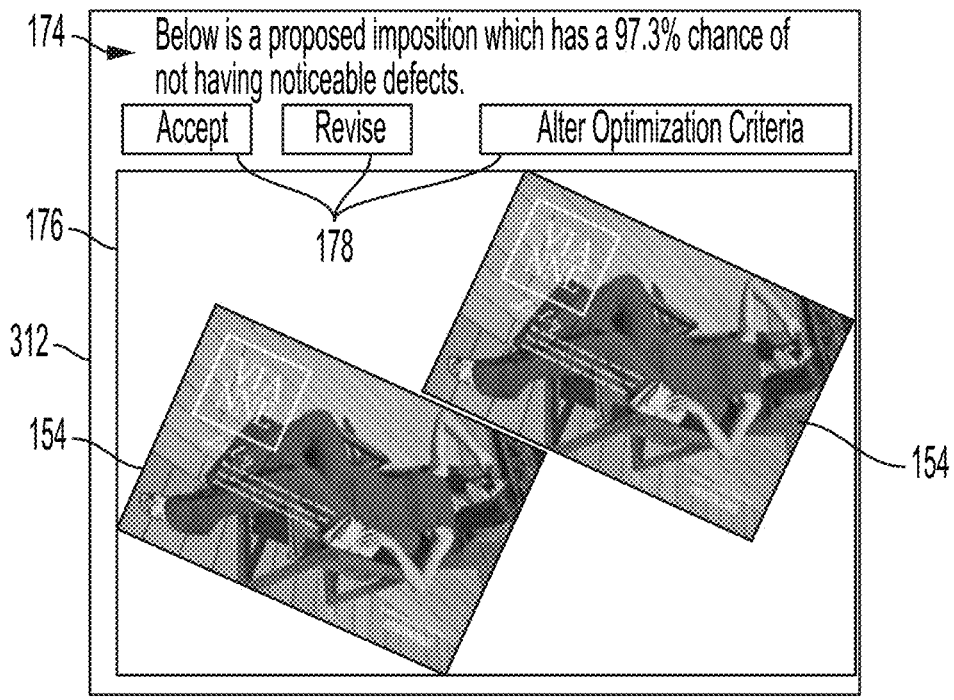
FIG. 7 is a conceptual image of a user interface illustrating a representation of an optimized imposition.

As shown in FIG. 7, this representation 176 of how the job image would appear positioned on the print media can be displayed on the printer's user interface 312 along with the defect probability (as shown in item 126 in FIG. 1). For example, the user interface 312 can display a message 174 informing the user that the proposed imposition 176 has a 97.3% chance of not having noticeable defects (where 97.3% was the pristine-print probability score for this imposition found in item 122, discussed above).

As also shown in FIG. 7, the user interface 312 can also present other options 178 that can allow the user the "accept" the proposed imposition (representation 176). Alternatively, the options 178 can include options such as a "revise" option that allows the user to manually change the proposed imposition. Other options 178 can allow the user to alter which criteria are included in the optimization and/or the weighting of that criteria. Therefore, the user interface can receive, in response, feedback from the user (as shown in item 128 in FIG. 1). If the feedback further revises the orientation and/location of the job image, processing returns to item 122.

Figure 8:
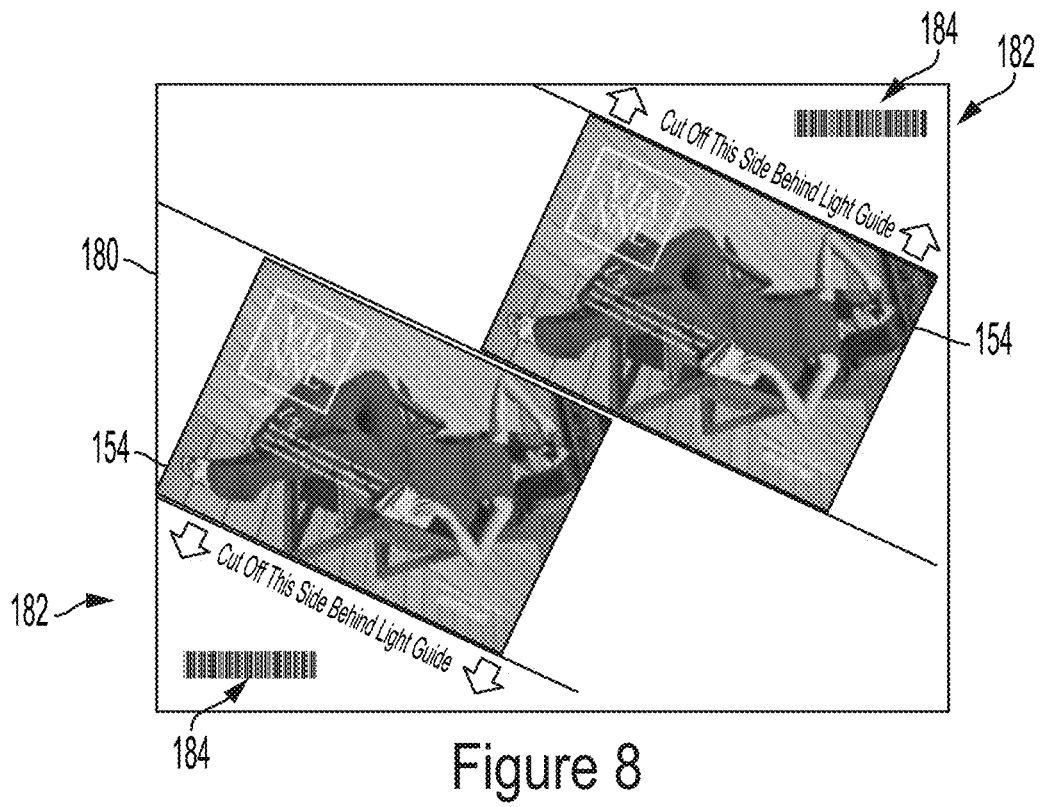
FIG. 8 is an illustration of a coversheet.

Otherwise, if the feedback indicates that the reorientation/repositioning is acceptable in item 128, processing proceeds to item 130 where the methods herein can automatically create a coversheet that has cutting alignment lines corresponding to the revised orientation of the job image. An exemplary coversheet 180 is shown in FIG. 8. This coversheet 180 includes lines that are aligned with edges of the job images 154 and instructions 182 to the user that instruct the user which side to cut off (along with directional arrows to assist the user).

With respect to the coversheet 180 in item 130, when users of a guillotine cutter need to cut a smaller square or rectangle that is imposed on a larger sheet, there is no simple way to make a cut that is not parallel or perpendicular to the edges of the printed sheet with a conventional guillotine because the paper typically presses against the back fence of the guillotine mechanism and the cut is parallel to the back fence guide. If the user wants to make a cut non-orthogonal with the page, the user has to manually estimate where to cut.

To address these issues, as shown in FIG. 8, the coversheet 180 has cutting alignment lines corresponding to the revised orientation of the job image 154 and can optionally include the images 154 for ease of user reference. The coversheet 180 is a supplemental cutting guide with the outline of the cuts clearly marked to assist the user at the guillotine. Almost all guillotine cutters have either a laser guide showing where the blade will touch the stack, or a manual foot operated indicator showing where the blade will touch the top of the stack, both of which assist the operator in positioning the stack under the blade. Therefore, the guidelines on the coversheet 180 created in item 130 are clearly marked so the user can see where the blade should touch the stack, with arrows showing where to cut.

The coversheet 180 can be reprinted as often as necessary within the job to allow practical lifts for the guillotine. The coversheet 180 can also contain information for downstream reading for finishing (e.g., vector shift). For example, the coversheet created in item 130 can include a glyph, barcode, or other machine-readable code 184 that contains job image shift information for a downstream finisher.

As shown in item 132, these methods can then automatically print the job image on the print media at the revised orientation (or the additionally revised orientation/location, post-user feedback) and also print the coversheet.

Figure 9:
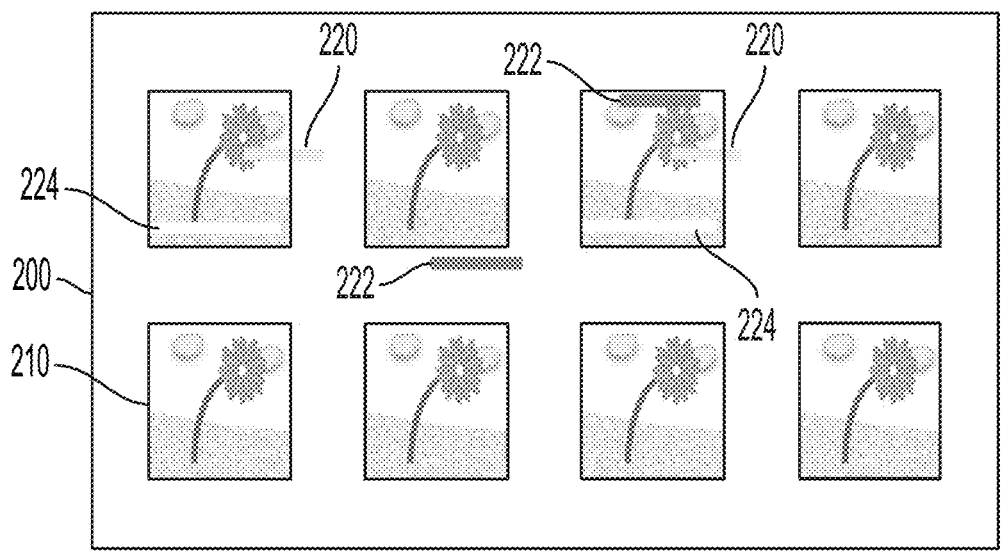
FIG. 9 is a scan image of a test print with printing defects.

FIG. 9 illustrates the features herein using a different example of a job image 210 containing a plant, ground, sky, and clouds. The job image 210 has an 8-up imposition in FIG. 9. FIG. 9 shows an image 200 from scan of a test print of such an imposition of the job image 210. The scan contains some printing defects that cause image quality issues. Specifically, the printing defects shown are light scratches 220, heavy scratches 222, and missing printing 224 caused by, for example, clogged jets. In the following examples shown in FIGS. 10-13, these defects (220, 222, 224) remain in the same locations in each figure to illustrate how each solution deals with these printing defects differently.

Figure 10:
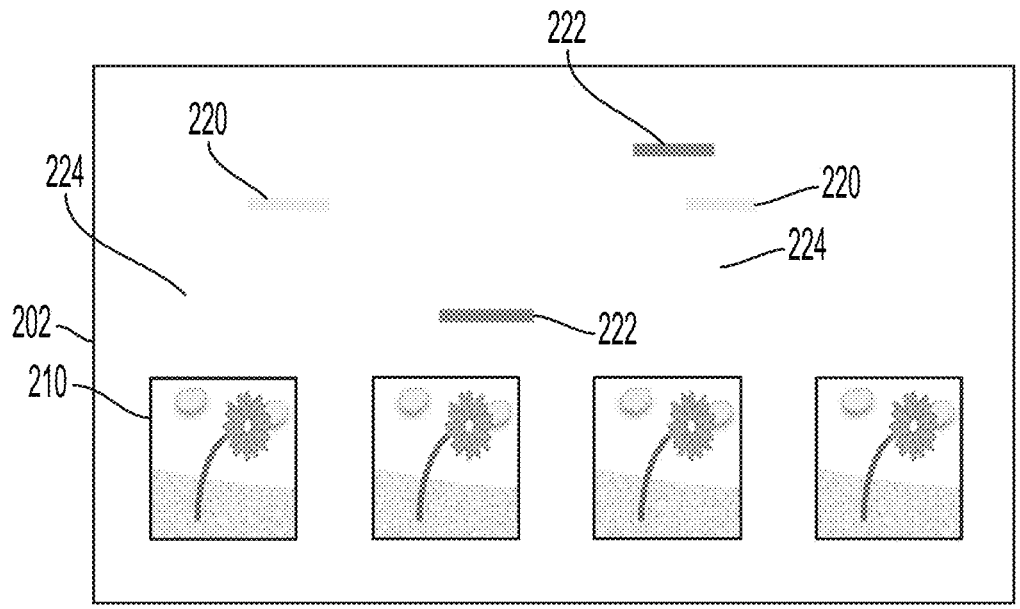
FIGS. 10-13 are alternative illustrations of different optimized impositions of a print job that avoid intersections of sensitive image zones and printing defects.

FIG. 10 shows a simple imposition 202 applied to this job 200 to reduce the number of defective prints produced. In the imposition 202 shown in FIG. 10, the top row of job images 210 is removed (e.g., 8-up changed to 4-up) to leave only the bottom row of job images 210, which do not suffer from the image quality issues caused by the light scratches 220, heavy scratches 222, and missing printing 224 (which printing defects remain in FIG. 10 for reference locations). While the solution imposition 202 presented in FIG. 10 produces defect free prints, it does so at the cost of wasted sheet area and would require twice as much print media, and possibly twice as much printing time.

Figure 11:
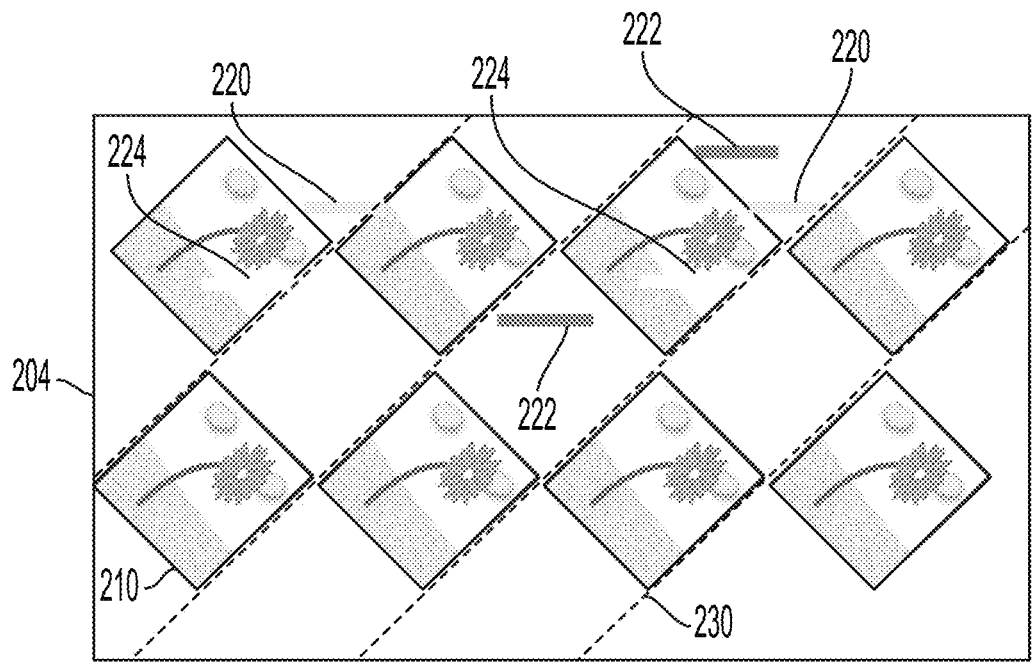

FIG. 11 illustrates a different resulting imposition 204 that uses the processing set forth in FIG. 1, discussed above, applied to the job 200 shown in FIG. 9. The imposition 204 could be produced by item 124 in FIG. 1, discussed above, for example. More specifically, in the imposition 204 in FIG. 11, all job images 210 are rotated approximately 45°. This causes the job images 210 to mostly miss the locations of the light scratches 220 and heavy scratches 222. Further, the sky and ground areas of the job image 210 are classified as being less sensitive zones, while the plant is a more sensitive zone (see items 116-118, FIG. 1). The missing printing 224 shares coordinates with these less sensitive zones (sky, ground) and does not share coordinates with the more sensitive plant in job image 210. Rotating all images the same amount of rotation allows simplified placement of cut lines 230 (which would be located in the illustrated broken line positions on the coversheet).

Figure 12:
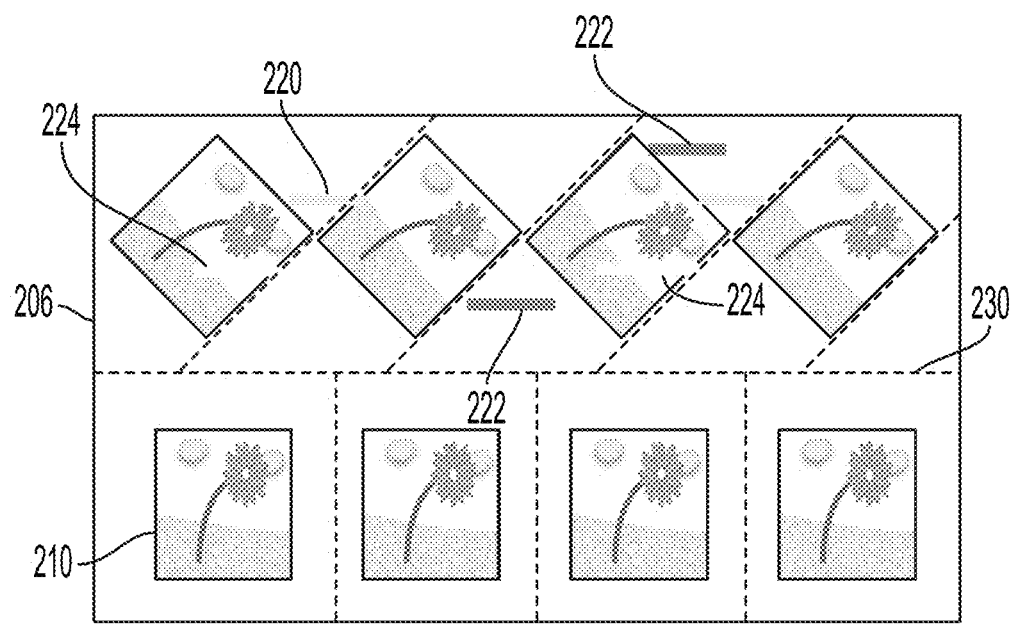

FIG. 12 illustrates a different resulting imposition 206 that again uses the processing set forth in FIG. 1, discussed above, applied to the job 200 shown in FIG. 9. Again, this imposition 206 could be produced by item 124 in FIG. 1, discussed above, for example. More specifically, in the imposition 206 in FIG. 12, the top row of job images 210 are rotated as was done in FIG. 11 (which prevents high sensitivity zones from being affected); however, the bottom row is not. This causes a different pattern of cut lines 230 to be used in FIG. 12 (when compared to, for example, FIG. 11) which may be desirable in some situations.

Figure 13:
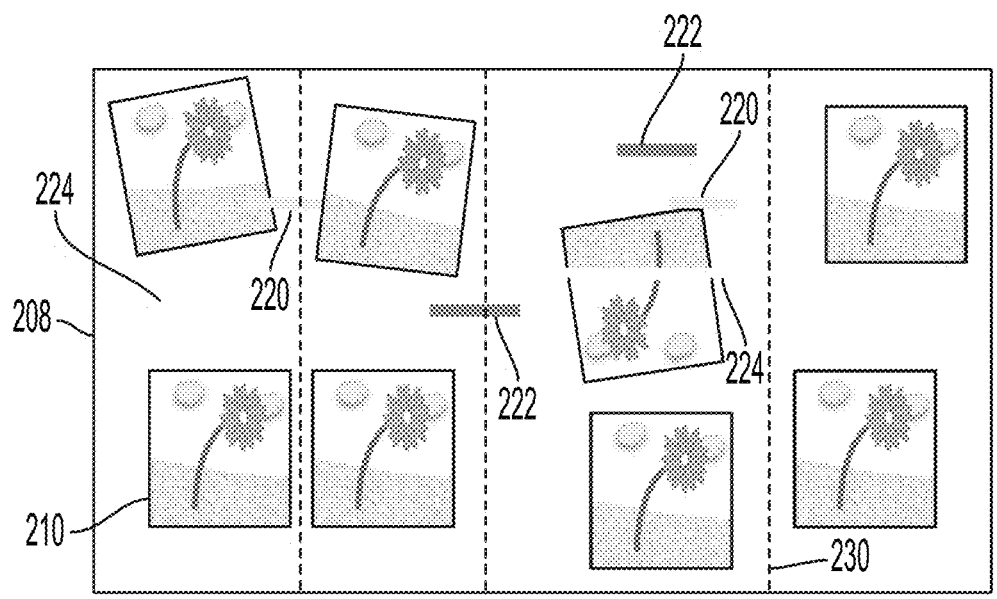

FIG. 13 illustrates a different resulting imposition 208 that also uses the processing set forth in FIG. 1, discussed above, applied to the job 200 shown in FIG. 9. Again, this imposition 208 could be produced by item 124 in FIG. 1, discussed above, for example. More specifically, in the imposition 208 in FIG. 13, some of the job images 210 are unmoved and unrotated, others are only rotated, while others still are moved and rotated. FIG. 13 shows that irregular placements and rotations may result from the optimization processing shown in FIG. 1.

Depending upon the weighting and criteria used for the optimization, one of FIGS. 10-13 would have the highest score and would be selected as the optimum solution. Therefore, the above processing optimizes the layout of n-up print jobs to avoid having high rated defects share coordinates with sensitive zones of the job image by rotating job images any amount necessary (not just in 90° increments). Further, these rotations can be consistent and made to all n-up job images on the sheet or can be made to only some of the job images on the sheet. Also, the movement and rotation of each job image in the n-up imposition can be individual and not dependent upon rotation and movement of other job images on the same sheet. The flexibility of these methods and systems allows the maximum amount of optimization which reduces waste, increases image quality, and promotes user satisfaction.

Thus, methods herein optimize the user's time by placing the print job on the page such that the probability of acceptable prints in maximized. Automating the layout option saves time and can solve layout combinations that may not be intuitive. This allows the operator to keep producing output and to make blind cuts using the guillotine with the coversheet. Additionally, these methods use existing hardware, so no new material cost incurred.

Figure 14:
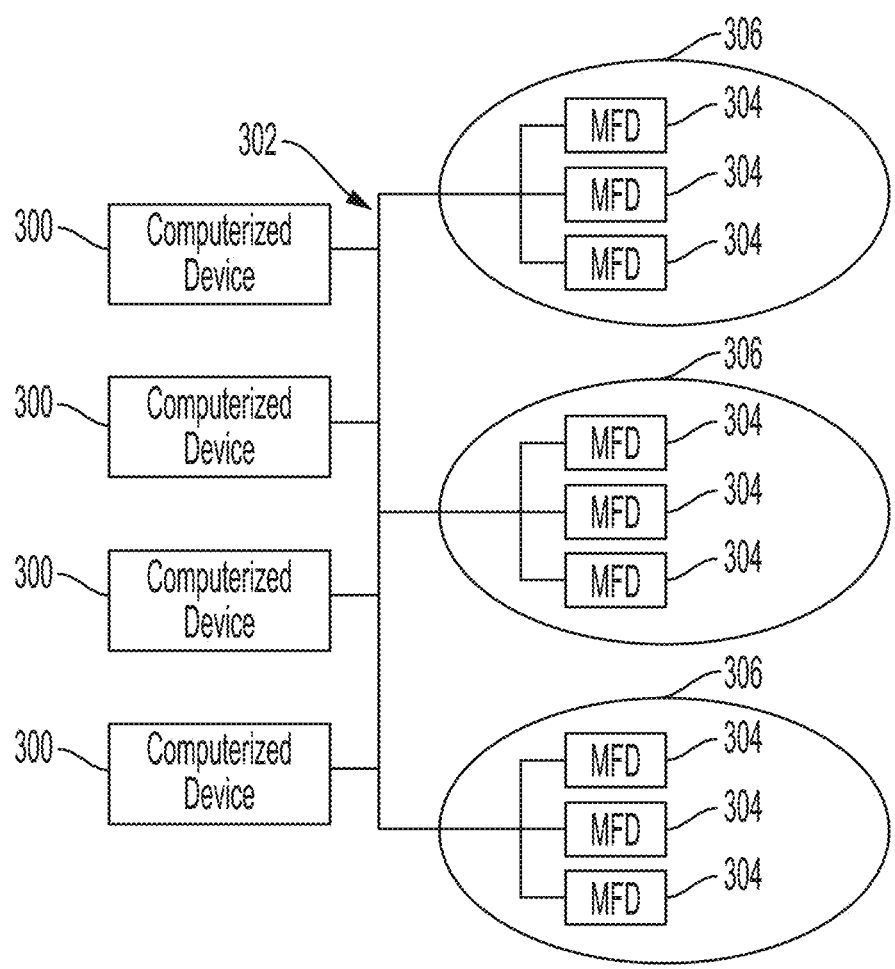
FIG. 14 is a schematic diagram illustrating systems herein.

As shown in FIG. 14, exemplary systems and methods herein include various computerized devices 300, 304 located at various different physical locations 306. The computerized devices 300, 304 can include print servers, printing devices, personal computers, portable computing devices, etc., and are in communication (operatively connected to one another) by way of a local or wide area (wired or wireless) network 302. Any of the devices shown in FIG. 14 can perform all of, or portions of, the processing described herein.

Figure 15:
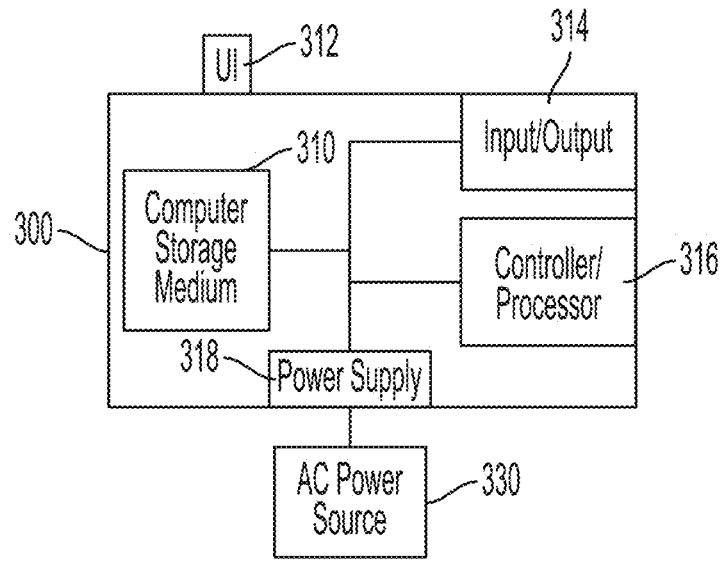
FIG. 15 is a schematic diagram illustrating computerized devices herein.

FIG. 15 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 15, a body housing has one or more functional components that operate on power supplied from an alternating current (AC) source 330 by the power supply 318. The power supply 318 can comprise a common power conversion unit, power storage element (e.g., a battery, etc.), etc.

Figure 16:
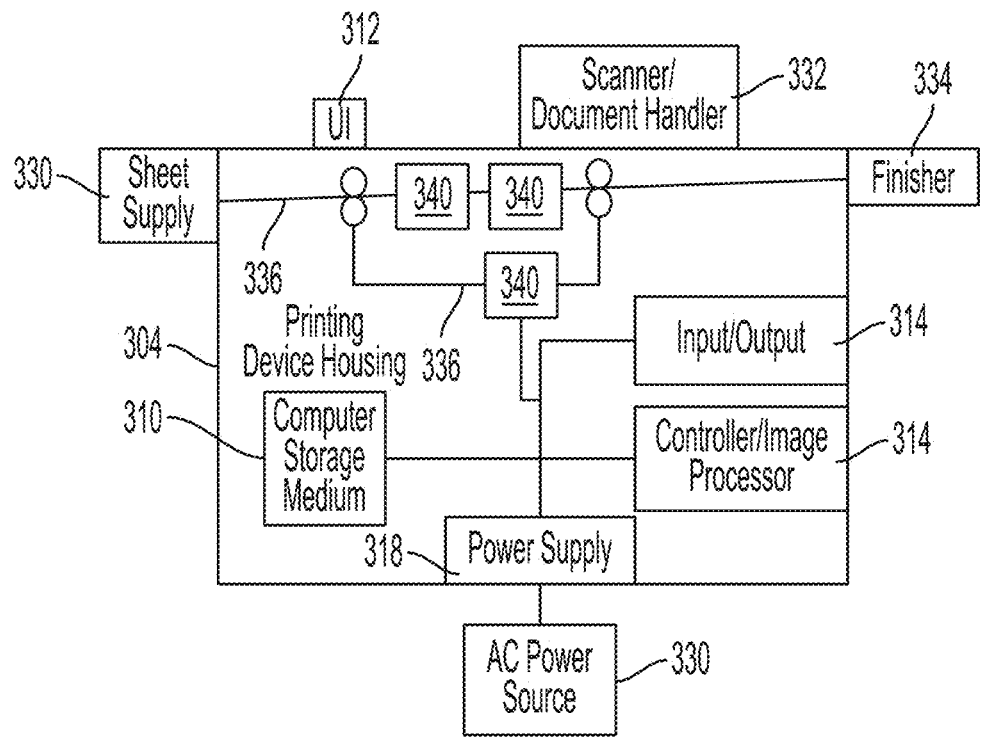
FIGS. 16-18 are schematic diagrams illustrating printing devices herein.

FIG. 16 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized job image processor 334 (that is different from a general purpose computer because it is specialized for processing job image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 330 (through the power supply 318).

Any of the above system elements can perform the method set forth in FIG. 1, either at the printer or using a remote processor. Therefore, printing device embodiments herein include (among other components) a processor 314, 316 and a printing engine 340, scanner 332, user interface 312, etc., all operatively connected to the processor 314, 316. If needed to identify print defect locations, the printing engine 340 can be adapted to print a test image element on print media using a printer and the scanner 332 can be adapted to scan the printed image element and produce a scan. The processor 314, 316 can be adapted to analyze the scan and automatically identify the print defect locations on the print media where printing defects occur. The processor 314, 316 is further adapted to assign a defect rating to each of the print defect locations based on the likelihood of the printing defects occurring at the print defect locations.

The processor 314, 316 can also be adapted to assign different sensitivity values to different zones of the job image being prepared for printing on the print media by the printing engine 340. The processor 314, 316 is adapted to assign these different sensitivity values by identifying image elements (and/or categories of image elements) within the job image and referencing a known chart, table, database, etc., of sensitivity values for the image elements to allocate a sensitivity value to each of the image elements. The processor 314, 316 is adapted to create at least one high-sensitivity zone and at least one low-sensitivity zone segregating relatively high-sensitivity image elements (having sensitivity values above the threshold sensitivity value) from relatively low-sensitivity image elements (having sensitivity values no greater than the threshold sensitivity value).

To avoid locating one or more of the high-sensitivity zones in the print defect locations, the processor 314, 316 is adapted to change the orientation of the job image to a revised orientation, relative to the print media. The processor 314, 316 can also be adapted to change the location of the job image to a revised location, relative to the print media, and even remove printing on the print media external to the job image, when changing the location of the job image, to avoid locating the high-sensitivity zones in the print defect locations.

After changing the orientation and/or location of the job image, the processor 314, 316 is adapted to calculate the probability that the revised location will result in a defect-free printing of the job image based on the defect rating of the print defect locations and based on the location of the high-sensitivity zones relative to the print defect locations. The user interface 312 is adapted to display a representation of how the job image would appear positioned on the print media in the revised orientation and/or location and the defect probability before the printing engine 340 prints the job image. The user interface 312 is also adapted to receive feedback from the in response to outputting the job image representation and defect probability. In turn, the processor 314, 316 is adapted to revise the orientation of the job image to an additionally revised orientation based on such feedback.

The processor 314, 316 can also be adapted to create a coversheet having cutting alignment lines corresponding to the revised orientation of the job image. The printing engine 340 is adapted to print the job image on the print media at the revised orientation and print the coversheet.

Figure 17:
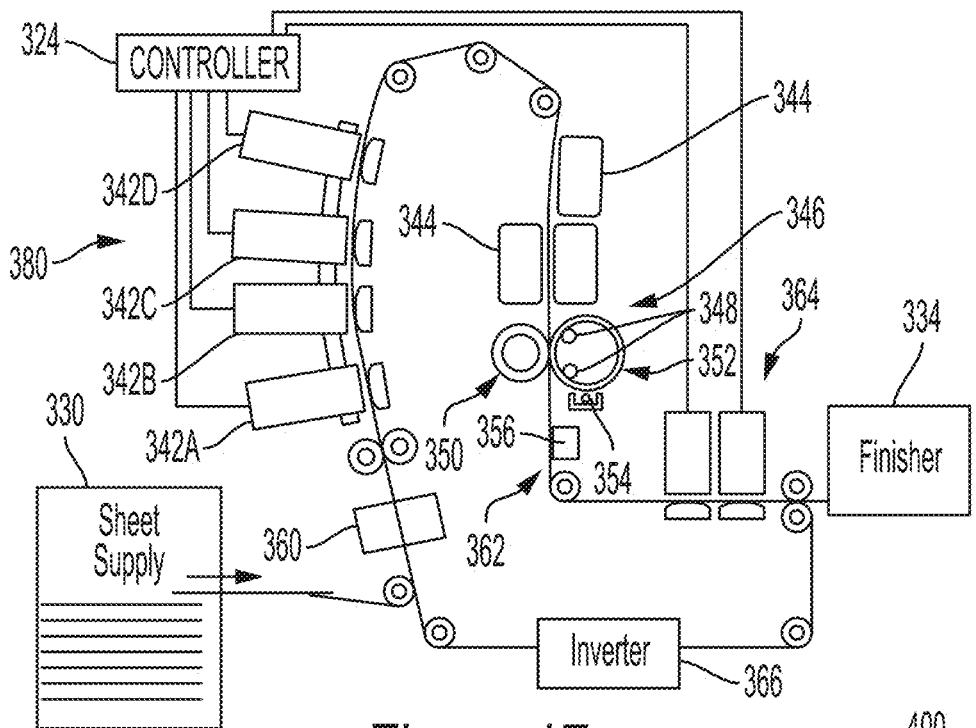
Figure 18:
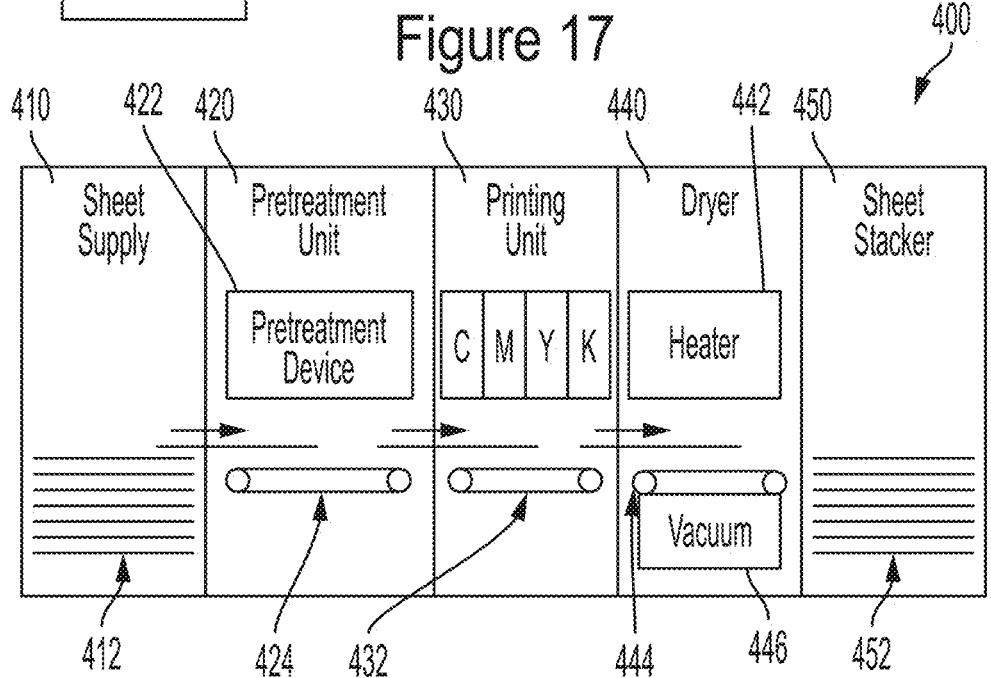

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 17, or a high-speed aqueous imaging system, as shown in FIG. 18.

More specifically, FIG. 17 illustrates one example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material). A media conditioner 360, printed sheet conditioner 344, coating station 364, and finisher 334.

The media is propelled by a sheet transport 362 that can include a variety of motors rotating one or more rollers. For duplex operations, an inverter 366 may be used to flip the sheet over to present a second side of the media to the printheads 342A-342D.

The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads, but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 18 illustrates an inkjet or aqueous ink printer system 400 that is one of the printers 304, discussed above. Specifically, FIG. 18 illustrates a high-speed ink jet or aqueous ink image producing machine or printer 400. The printer 400 includes a media supply 410, a pretreatment unit 420, a printing unit 430, a dryer 440, and a sheet stacker 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 18) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 18 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker 450 receives and stacks the printed sheets 452.

While FIGS. 17 and 18 illustrate four marking stations 342, 350 adjacent or in contact with a rotating belt (348, 360), which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome job image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. A print job includes a set of data that is being prepared for printing, and can include job images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster job image processor (RIP) is a component used in a printing system that produces a raster job image also known as a bitmap from the print job. The bitmap is then sent to a printing device for output. Raster job image processing is the process that turns vector digital information into a high-resolution raster job image.

A "pixel" refers to the smallest segment into which a job image can be divided. Received pixels of an input job image are associated with a color value defined in terms of a color space, such as color, intensity, lightness, brightness, or some mathematical transformation thereof.

In addition, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
   a processor;
   a user interface operatively connected to the processor; and
   a printing engine operatively connected to the processor,
   wherein the processor is configured to identify print defect locations where printing defects occur,
   wherein the processor is configured to assign different sensitivity values to different zones of a job image being prepared for printing by the printing engine,
   wherein the processor is configured to change an orientation of the job image to a revised orientation, relative to print media, to avoid locating one or more high-sensitivity zones of the job image in the print defect locations,
   wherein the processor is configured to assign a defect rating to each of the print defect locations based on a likelihood of printing defects occurring at the print defect locations,
   wherein the processor is configured to, after changing the orientation of the job image, calculate a defect probability of the revised orientation resulting in a defect-free printing of the job image based on the defect rating of the print defect locations, and
   wherein the user interface is configured to output the defect probability before the printing engine prints the job image,
   wherein the high-sensitivity zones are ones of the zones having a sensitivity value above a threshold sensitivity value, and
   wherein the printing engine is configured to print the job image on the print media at the revised orientation.

2. The printing device according to claim 1, wherein the processor is configured to change a location of the job image to a revised location, relative to the print media, to avoid locating the high-sensitivity zones in the print defect locations.

3. The printing device according to claim 2, further comprising removing printing on the print media when changing the location of the job image to avoid locating the high-sensitivity zones in the print defect locations.

4. The printing device according to claim 1,
   wherein the processor is configured to calculate the defect probability additionally based on a location of the high-sensitivity zones relative to the print defect locations.

5. The printing device according to claim 4, wherein the user interface is configured to receive feedback, and
   wherein the processor is configured to revise the orientation of the job image to an additionally revised orientation based on the feedback.

6. The printing device according to claim 1, wherein the processor is configured to assign different sensitivity values by:

identifying image elements within the job image; and
referencing a database of sensitivity values for the image elements to allocate a sensitivity value to each of the image elements.

7. The printing device according to claim 1, wherein the processor is configured to create at least one of the high-sensitivity zones and at least one low-sensitivity zone segregating high-sensitivity image elements having the sensitivity values above the threshold sensitivity value from low-sensitivity image elements having the sensitivity values no greater than the threshold sensitivity value.

8. A printing device comprising:
   a processor;
   a user interface operatively connected to the processor;
   a printing engine operatively connected to the processor, wherein the printing engine is configured to print a printed image element on print media using a printer; and
   a scanner operatively connected to the processor, wherein the scanner is configured to scan the printed image element and produce a scan,
   wherein the processor is configured to analyze the scan and automatically identify print defect locations on the print media,
   wherein the processor is configured to assign different sensitivity values to different zones of a job image being prepared for printing on the print media by the printing engine,
   wherein the processor is configured to change an orientation of the job image to a revised orientation, relative to the print media, to avoid locating one or more high-sensitivity zones of the job image in the print defect locations,
   wherein the processor is configured to assign a defect rating to each of the print defect locations based on a likelihood of printing defects occurring at the print defect locations,
   wherein the processor is configured to, after changing the orientation of the job image, calculate a defect probability of the revised orientation resulting in a defect-free printing of the job image based on the defect rating of the print defect locations,
   wherein the user interface is configured to output the defect probability before the printing engine prints the job image,
   wherein the high-sensitivity zones are ones of the zones having a sensitivity value above a threshold sensitivity value,
   wherein the processor is configured to create a coversheet having cutting alignment lines corresponding to the revised orientation of the job image, and
   wherein the printing engine is configured to print the job image on the print media at the revised orientation and print the coversheet.

9. The printing device according to claim 8, wherein the processor is configured to change a location of the job image to a revised location, relative to the print media, to avoid locating the high-sensitivity zones in the print defect locations.

10. The printing device according to claim 9, further comprising removing printing on the print media when changing the location of the job image to avoid locating the high-sensitivity zones in the print defect locations.

11. The printing device according to claim 8 wherein the processor is configured to calculate the defect probability additionally based on a location of the high-sensitivity zones relative to the print defect locations.

12. The printing device according to claim 11, wherein the user interface is configured to receive feedback, and
wherein the processor is configured to revise the orientation of the job image to an additionally revised orientation based on the feedback.

13. The printing device according to claim 8, wherein the processor is configured to assign different sensitivity values by:
identifying image elements within the job image; and
referencing a database of sensitivity values for the image elements to allocate a sensitivity value to each of the image elements.

14. The printing device according to claim 8, wherein the processor is configured to create at least one of the high-sensitivity zones and at least one low-sensitivity zone segregating high-sensitivity image elements having the sensitivity values above the threshold sensitivity value from low-sensitivity image elements having the sensitivity values no greater than the threshold sensitivity value.

15. A method comprising:
identifying print defect locations by a printer;
assigning different sensitivity values to different zones of a job image being prepared for printing by the printer;
changing an orientation of the job image to a revised orientation, relative to print media, to avoid locating one or more high-sensitivity zones of the job image in the print defect locations, wherein the high-sensitivity zones are ones of the zones having a sensitivity value above a threshold sensitivity value;
assigning a defect rating to each of the print defect locations based on a likelihood of printing defects occurring at the print defect locations;
after changing the orientation of the job image, calculating a defect probability of the revised orientation resulting in a defect-free printing of the job image based on the defect rating of the print defect locations and based on a location of the high-sensitivity zones relative to the print defect locations; and
outputting the defect probability on a user interface; and
printing the job image on the print media at the revised orientation.

16. The method according to claim 15, further comprising changing a location of the job image to a revised location, relative to the print media, to avoid locating the high-sensitivity zones in the print defect locations.

17. The method according to claim 16, further comprising removing printing on the print media when changing the location of the job image to avoid locating the high-sensitivity zones in the print defect locations.

18. The method according to claim 15, further comprising:
calculating the defect probability of the revised orientation resulting in a defect-free printing of the job image additionally based on a location of the high-sensitivity zones relative to the print defect locations.

19. The method according to claim 18, further comprising:
receiving feedback through the user interface; and
revising the orientation of the job image to an additionally revised orientation based on the feedback.

20. The method according to claim 15, wherein the assigning different sensitivity values comprises:
identifying image elements within the job image; and
referencing a database of sensitivity values for the image elements to allocate a sensitivity value to each of the image elements.

\* \* \* \* \*